Figure 1:
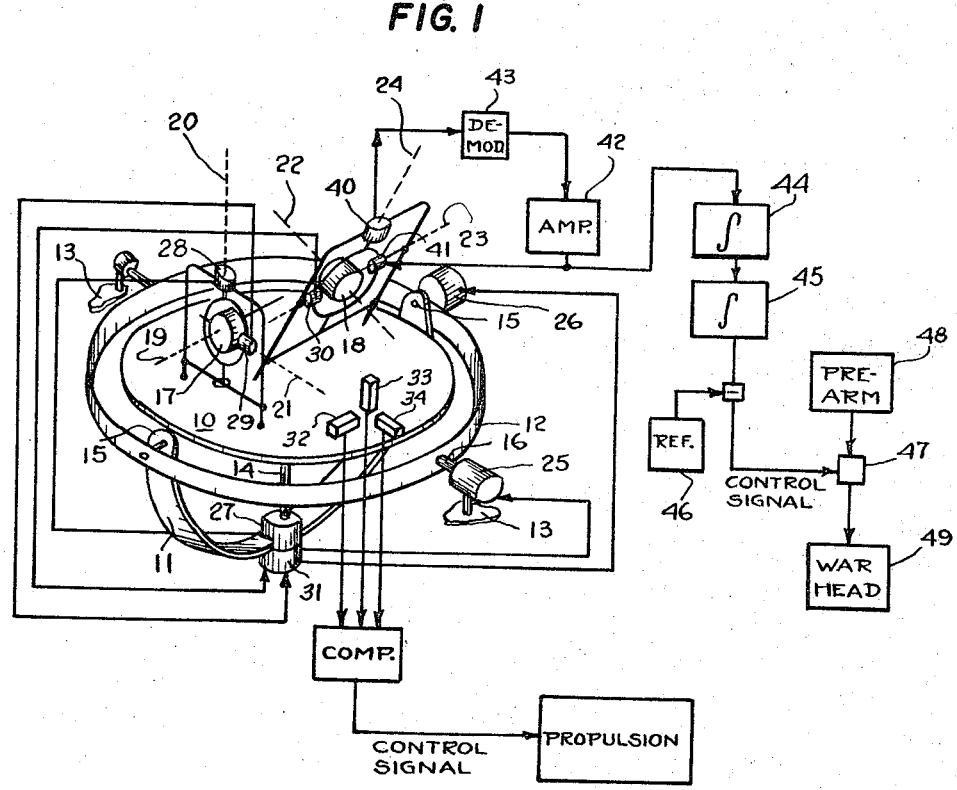

Aug. 29, 1967     B. LITMAN ET AL     3,338,166

SAFETY DEVICE FOR BALLISTIC MISSILES

Filed Dec. 18, 1959

INVENTORS.
BERNARD LITMAN
MURRAY J. STATEMAN
BY

*Raymond A. Paquin*
ATTORNEY.

United States Patent Office

3,338,166
Patented Aug. 29, 1967

3,338,166
SAFETY DEVICE FOR BALLISTIC MISSILES
Bernard Litman, New York, and Murray J. Stateman, Wantagh, N.Y., assignors to American Bosch Arma Corporation, a corporation of New York
Filed Dec. 18, 1959, Ser. No. 860,606
9 Claims. (Cl. 102—70.2)

The present invention relates to ballistic missiles and has particular reference to means for enhancing their operational flight safety, i.e., for preventing their detonation at locations other than the intended target.

For obvious reasons, it is imperative that warheads carried by missiles are not allowed to explode on territory far removed from the intended target. In order to accomplish this, the warhead is disarmed whenever it appears to the safety apparatus aboard the missile that the missile will not impact the target, or that portions of the guidance system are not working properly.

The present invention is directed particularly to assuring that the platform and the gyroscopes of an inertially guided missile are not in gross error, i.e., the error contributed to the flight of the missile would not be great enough to drive the missile off course beyond the limits established for operational safety. Additional safety features may be incorporated in inertially guided missiles but these are not the subject of the present invention.

Gyroscopes are used to maintain the alignment of the airborne inertial coordinate system in which measurements and calculations are made. The gyros are mounted on a stable platform and sense changes in the platform with respect to inertial space. Deviations in attitude are indicated as gyro pickoff signals which are used to drive the platform back to its original attitude.

Any variation in the orientation of the gyro spin axes represents an error and will cause a corresponding error in the platform and in the missile attitude. In effect, the coordinates of the stored target will remain fixed in a drifting coordinate system, while the real target is moving and the warhead can impact far from the real target.

Inertial platforms are stabilized about three orthogonal axes, namely, roll, yaw and pitch, by gyroscopic means which may employ either two two-degree-of-freedom gyros, or three single-degree-of-freedom gyros for the stabilization. In the case of the two-degree-of-freedom gyros, a total of four axes are defined, three of which are active, and one of which is a redundant axis. The latter axis is maintained in a plane defined by two of the three axes and provides a ready reference for detecting platform drifts about either or both of those axes. When single-degree-of-freedom gyros are used, three gyroscopes define the three orthogonal axes while a fourth single-degree-of-freedom gyro detects platform drifts about its input, or the redundant axis, which may be tilted with respect to any or all of the controlled axes. It will be understood in the material that follows, that the term "redundant" axis denotes an axis which is not actively used in the platform stabilization, but is maintained in a given relationship with the established axes of roll, pitch and yaw. In the description to follow, the two-gyro platform is chosen for illustration but should not be considered as limiting the invention in any way. In the chosen embodiment, one gyro supplies the roll and azimuth axes, the other gyro the pitch axis. The other axis in the pitch gyro is termed the redundant axis, and the pitch gyro is slaved about this axis to keep the pitch gyro spin axis in or parallel to the plane formed by the roll and azimuth axes established by the first gyro. To accomplish this, the pickoff signal from the redundant axis is amplified and is used to drive the torquing device on the pitch axis of same gyro to counteract the drift about the redundant axis.

Severe drifts of either gyro are almost sure to show up as high torquing currents in the redundant axis slaving loop. The redundant axis signal is also a good indicator of platform servo failure. For example, a servo failure could cause a gyro to hit a limit stop and cause a large redundant axis signal to develop from the resulting high precession of the gyros.

In accordance with the present invention, the redundant axis pickoff signal is monitored, and if the current is excessive for a period of time, the prearm signal is inhibited. It is not only the magnitude of the redundant axis pickoff signal which is important, but the duration thereof must be considered since the miss distance at the target is dependent upon the terminal velocity error, rather than the acceleration error. Accordingly, the redundant axis pickoff signal is integrated once to indicate acceleration error and a second time to indicate velocity error. The result of the second integration is adapted to control the signal to the warhead.

Figure 2:
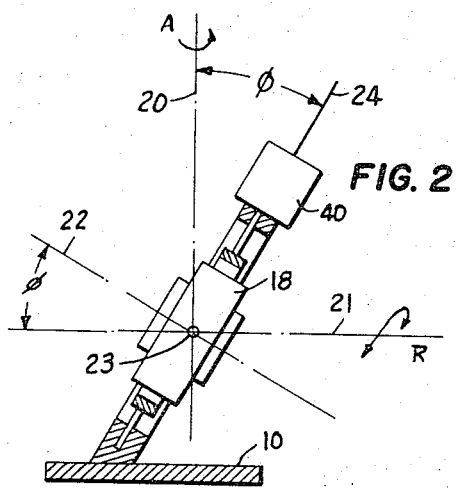

For a more complete understanding of the invention, reference may be had to the accompanying diagrams in which FIG. 1 illustrates the mechanical and electrical construction of one embodiment of the invention, and FIG. 2 is an explanatory diagram showing the geometrical axes involved.

With reference now to FIGURE 1, there is shown an inertially stabilized platform 10 which is suspended in the gimbal system 11, 12 from the missile airframe 13. The platform 10 is free to rotate in azimuth about shaft 14 with respect to gimbal frame 11, and about the orthogonal axis or shafts 15, 16 with respect to the gimbal ring 12 and the airframe 13.

The platform 10 carries a pair of two-degree-of-freedom gyroscopes 17, 18. Gyro 17 is supported in a gimbal system such that its spin axis 19 is parallel to the pitch axis whence the gimbal axes 20, 21 define the azimuth and roll axes, respectively, while gyroscope 18 is supported in a gimbal system such that the spin axis 22 of gyro 18 is perpendicular to the spin axis 19 of gyro 17 and inclined to both the azimuth axis 20 and roll axis 21. The axis 23 of the gimbal system of gyro 18 defines the pitch axis, while the axis 24 of that gimbal system is known as the redundant axis.

A pickoff device 40 on the redundant axis 24 energizes a torquing device 41 on axis 23 through amplifier 42, and demodulator 43 if an A.C. signal is produced by pickoff 40. By this means the spin axis of the gyro 18 is slaved to the null position of the pickoff 40 and, by proper mechanical construction of the gimbal system, is slaved to remain in or parallel to the roll azimuth plane defined by axes 20, 21.

In the operation, the gyros 17, 18 are initially aligned so as to define the three orthogonal axes 20, 21 and 23 by apparatus not shown but which is now well known in the art. During flight of the missile, the gyros are not torqued in any prescribed manner and are expected to maintain their orientation with extreme accuracy.

The platform 10 is driven by motors 25, 26 and 27 so as to keep the platform axes aligned with the axes defined by the gyros 17, 18. Thus, the motor 27 is energized by the pickoff 28 on the azimuth axis of gyro 17 and motors 25 and 26 are energized by the signals from pickoffs 29 and 30 on the roll and pitch axes of gyro 17 and 18 respectively. These pickoff signals are transmitted through the resolver 31 on shaft 14 in order to provide the proper components of each signal to the follow-up motors 25, 26.

The platform 10 carries three accelerometers 32, 33, 34 which are sensitive to accelerations in the three mutually orthogonal directions maintained by the gyros 17 and 18, and whose outputs are used to guide the missile toward the target and to cut off propulsion at the desired point in flight.

If the gyro axes drift away from their initial orientation, the platform will follow and the accelerometers will give indications of accelerations in axes which are displaced from the desired axes. Thus, the missile will not be guided to the desired target, and if the gyro drifts are excessive, the distance by which the missile misses the target may cause the missile to fall into friendly or neutral territory. To minimize the effect of this type of failure, the present invention causes the warhead to be unarmed or destroyed whenever the gyro drift appears excessive so that a live warhead does not fall on any location displaced from the target by more than a predetermined distance.

Since the platform is positioned according to the gyros, it will be seen that a drift of gyro 17 about either the roll or azimuth axes causes a like displacement of the platform 10 from the original orientation in space, resulting in a deviation between the gimbal system of gyro 18 and the plane of gyro 18. With reference to FIG. 2 the axes 20, 21, 22, 23 and 24 in their normal orientation is shown. Thus, axes 20, 21, and 23 are mutually orthogonal. The spin axis 22 of gyro 18 is in the plane of axes 20, 21 and is tilted by an angle $\phi$ from axis 21. The redundant axis 24 is perpendicular to axis 22 in the plane of axes 20, 21 and is displaced by the angle $\phi$ from axis 20. The redundant axis is fixed with respect to the platform 10. Assuming now that in following gyro 17 the platform 10 rotates about the roll axis 21 through an angle R and rotates about the azimuth axis 20 about an angle A, the component rotations about the axis 24 will be respectively $R \sin \phi$ and $A \cos \phi$. Thus as gyro 18 tends to maintain its spin axis in constant orientation, it will be seen that an angular displacement of the gyro 18 from its gimbal system will be produced about the redundant axis 24. The drift about the roll axis would, by itself, not be particularly troublesome but, when combined with a drift in pitch, it will result in a rotation about the azimuth axis.

The pickoff 40-torquer 41 loop tends to maintain the axis of gyro 18 in the roll-azimuth plane. Abnormal drift of the platform 10 about the axes of the gyro 17 will produce an abnormally high current in the torquer 41. The output of pickoff device 40 is proportional to the instantaneous angular displacement of the gyro 18 from its gimbal system about the axis 24. The rate at which the gyro precesses to realign itself is proportional to the magnitude of the input signal to torque motor 41. The integral of that input is proportional to the angle through which the spin axes has precessed up to that time. For a non-drifting platform, the instantaneous angle is zero. Any other value represents a misalignment. The error in the measurement of the cross range acceleration of the missile is proportional to the misalignment angle. The total velocity error is obtained from the integral of the acceleration error which is proportional to the integral of the instantaneous misalignment angle. A predetermined limit is set on the maximum tolerable velocity error and is compared with the integral of the instantaneous misalignment angle, i.e., the double integral of the rate at which the platform is drifting. If the measured error is greater than the acceptable limit the prearm signal to the warhead is inhibited or the warhead is destroyed and the safety of all areas displaced from the vicinity of the target is assured.

With reference now to FIG. 1, safety feature is obtained by applying the output of amplifier 42 to the input of an integrator 44 and the output of the first integrator 44 to the input of a second integrator 45. The output of integrator 45, which represents the misalignment velocity error, is matched against a signal proportional to the maximum allowable velocity error, from signal source 46.

The difference signal is adapted to control a gate or relay 47 between the prearm signal source 48 and the arming device 49 of the warhead 50. So long as the error is small, the output of integrator 45 is small and the difference between the reference signal 46 and the integrator output is of such polarity and/or magnitude that the gate 47 allows the warhead to be armed at the proper time. As soon as the error increases beyond a dangerous predetermined level, the difference signal between the reference signal and the output of the integrator 45 inhibits the gate 47 from passing the prearm signal to the warhead, and prevents the initial arming of the warhead. Alternatively, the control signal to relay 47 may initiate destruction of the missile if destruction appears advisable from a tactical viewpoint.

The gyro 18 has been described as being tilted with respect to the azimuth and roll axes. The angle of tilt may be chosen so as to accentuate the proportion of the tilt about either axis which effects rotation about the redundant axis. Thus, if the redundant axis is parallel to the azimuth axis, the rotation about the redundant axis will be entirely due to drift about the azimuth and will not be affected by drift about the roll axis. The tilted axis is also desirable for other reasons and is in use in some platforms at this time. It must be remembered that the particular choice of which axes are stabilized by one gyro and which by the other is not directly a matter of this invention, and any choice other than that described can be made if it appears desirable. The description has been illustrative only and not limiting.

In those cases where the tilted axis is not used in the platform gyros, and the tilted arrangement is desirable for monitoring purposes, a gyro of lower accuracy can be mounted on the platform solely for the monitoring capability without major redesign of the existing system.

It should be emphasized that although the description has detailed a platform stabilized by two-degree-of-freedom gyros, the redundant axis monitoring is not limited to such a system. For example, if single-degree-of-freedom gyros, such as integrating gyros are used in the manner described in Patent 2,752,793 to C. S. Draper et al. for "Gyroscopic Apparatus," a fourth integrating gyro may be attached to the stabilized platform having its input axis aligned with, or inclined to, any chosen stabilized axis or axes as dictated by which axis or axes should be monitored. The output of the gyro monitoring the drift or rotation about the redundant axis is then used to inhibit the arming of the warhead whenever the deflection of that gyro with respect to the platform exceeds a predetermined amount.

We claim:

1. In an inertial guidance system for ballistic missiles, a platform in said missile, means for stabilizing said platform in space, a gyroscope on said platform, pickoff means on said gyroscope, torquing means on said gyroscope and energized by said pickoff means for causing said gyro to precess so as to reduce said pickoff output to zero, integrating means for integrating the output of said pickiff means, a source of a reference signal, means for obtaining the difference between said reference signal and said integrated output and means actuated by said difference signal for deactivating a warhead carried by said missile when the difference exceeds a predetermined value.

2. In an intertial guidance system for ballistic missiles, a platform in said missile, means for stabilizing said platform in space, a gyroscope on said platform, pickoff means on said gyroscope, torquing means on said gyroscope and energized by said pickoff means far causing said gyro to precess so as to reduce said pickiff output to zero, integrating means for performing the double integration of the output of said pickoff means, a source of a reference signal, means for obtaining the difference between said reference signal and said integrated output and means actuated by said difference signal for deactivating a warhead carried by said missile when the difference exceeds a predetermined value.

3. In an inertial guidance system for ballistic missiles, a platform in said missile, means for stabilizing said platform in space, a gyroscope on said platform, pickoff means on said gyroscope, torquing means on said gyroscope and energized by said pickoff means for causing said gyro to precess so as to reduce said pickoff output to zero, integrating means for integrating the output of said pickoff means, a source of a reference signal, means for obtaining the difference between said reference signal and said integrated output and means actuated by said difference signal for deactivating a warhead carried by said missile when the difference exceeds a predetermined value.

4. In an inertial guidance system for ballistic missiles, a platform stabilized in space, gyroscopic means including a redundant gyro axis for stabilizing said platform, pickoff means on said redundant axis of said gyroscopic means for indicating deviation between said platform and said gyroscopic means, integrating means for integrating the output of said pickoff means, a source of a reference signal, means for obtaining the difference between said reference signal and said integrated output and means actuated by said difference signal for deactivating a warhead carried by said missile when the difference exceeds a predetermined value.

5. In an inertial guidance system for ballistic missiles, a platform stabilized in space, gyroscopic means including a redundant gyro axis for stabilizing said platform, pickoff means on said redundant axis of said gyroscopic means for indicating deviation between said platform and said gyroscopic means, integrating means for performing the double integration of the output of said pickoff means, a source of a reference signal, means for obtaining the difference between said reference signal and said integrated output and means actuated by said difference signal for deactivating a warhead carried by said missile when the difference exceeds a predetermined value.

6. In an inertial guidance system for ballistic missiles, a platform stabilized in space, gyroscopic means including a redundant gyro axis carried by said platform pickoff means on said redundant axis of said gyroscopic means for indicating deviation between said platform and said gyroscopic means, integrating means for integrating the output of said pickoff means, a source of a reference signal, means for obtaining the difference between said reference signal and said integrated output and means actuated by said difference signal for deactivating a warhead carried by said missile when the difference exceeds a predetermined value.

7. In an inertial guidance system for ballistic missiles carrying an explosive warhead, a platform carrying a plurality of accelerometers, gyroscopic means including a plurality of gyroscopes for stabilizing said platform in space about three mutually perpendicular inertial axes pickoff means on one of said gyroscopes adapted to produce an output signal indicative of the relative angular displacement of said gyro and said platform about an axis fixed to said platform, torquing means on said gyro adapted to cause said gyro to precess about said fixed axis upon energization thereof, electrical connections between said pickoff means and said torquing means whereby said torquing means is actuated to reduce said displacement to zero, circuit means responsive to an input signal of predetermined magnitude for disarming said warhead, double integrating means having an input and an output, said input being connected to the output of said pickoff device and said output being connected to the input of said circuit means.

8. In an inertial guidance system for ballistic vehicles, a platform carrying a plurality of accelerometers, gyroscopic means including a plurality of gyroscopes for stabilizing said platform in space about three mutually perpendicular inertial axes, pickoff means on one of said gyroscopes adapted to produce an output signal indicative of the relative angular displacement of said gyro and said platform about an axis fixed to said platform, torquing means on said gyro adapted to cause said gyro to precess about said fixed axis upon energization thereof, electrical connections between said pickoff means and said torquing means whereby said torquing means is actuated to reduce said displacement to zero, circuit means responsive to an input signal of predetermined magnitude, double integrating means having an input and an output, said input being connected to the output of said pickoff device and said output being connected to the input of said circuit means.

9. In an instrument platform mounted on a vehicle and stabilized with respect to inertial axes in space for determining the velocity of said vehicle along said axes, a gyroscope mounted on said platform for freedom of rotation about an axis fixed to said platform, pickoff means producing an output proportional to the relative rotation between said gyroscope and said platform about said axis, torquing means on said gyroscope and adapted to precess said gyroscope about said axis, electrical connections between said pickoff means and said torquing means whereby said gyro is caused to precess so as to reduce said pickoff output to zero, integrating means having an input and an output, said input being connected to the output of said pickoff means, electrical circuit means connected to the output of said integrating means whereby said electrical circuit means is responsive to velocity error of said vehicle caused by drifting of said platform with respect to said inertial axes.

References Cited

UNITED STATES PATENTS

| | | | |
|---|---|---|---|
| 2,613,071 | 10/1952 | Hansel | 264—1 |
| 2,894,396 | 7/1959 | Jofeh | 74—5.37 |
| 2,909,931 | 10/1959 | James | 74—5.6 |
| 2,929,250 | 3/1960 | Passarelli et al. | 74—5.6 |
| 2,937,532 | 5/1960 | Emmerich | 74—5 |
| 2,949,785 | 8/1960 | Singleton et al. | |

BENJAMIN A. BORCHELT, *Primary Examiner.*

ARTHUR M. HORTON, SAMUEL FEINBERG, SAMUEL BOYD, *Examiners.*

P. G. BETHERS, L. L. HALLACHER, W. C. ROCH, *Assistant Examiners.*